United States Patent
Murakami (10) Patent No.: US 10,611,228 B2
(45) Date of Patent: Apr. 7, 2020

(54) ENGINE MOUNTING STRUCTURE

(71) Applicant: TOYOTA JIDOSHA KABUSHIKI KAISHA, Toyota-shi, Aichi-ken (JP)

(72) Inventor: Hiroshi Murakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/184,033

(22) Filed: Nov. 8, 2018

(65) Prior Publication Data

US 2019/0143799 A1 May 16, 2019

(30) Foreign Application Priority Data

Nov. 15, 2017 (JP) ................. 2017-220281

(51) Int. Cl.
*B60K 5/12* (2006.01)
*B62D 21/11* (2006.01)

(52) U.S. Cl.
CPC .............. *B60K 5/1208* (2013.01); *B60K 5/12* (2013.01); *B60K 5/1216* (2013.01); *B60K 5/1291* (2013.01); *B62D 21/11* (2013.01)

(58) Field of Classification Search
CPC ...... B60K 5/1208; B60K 5/12; B60K 5/1216; B60K 5/1241; B60K 5/1283; B60K 5/129; B62D 21/11
See application file for complete search history.

(56) References Cited

U.S. PATENT DOCUMENTS

| | | | | |
|---|---|---|---|---|
| 1,731,837 A * | 10/1929 | Wood | .................. | B60K 5/1208 180/291 |
| 1,738,532 A * | 12/1929 | Harbour | ............... | B60K 5/1216 123/192.1 |
| 2,076,034 A * | 4/1937 | Lampman | ............ | B60K 5/1208 248/605 |
| 2,308,458 A * | 1/1943 | Saurer | .................. | B60K 5/1216 248/605 |
| 2,308,962 A * | 1/1943 | Riesing | ................. | F16F 3/0873 248/605 |
| 3,702,178 A * | 11/1972 | Schulz | .................. | F16F 3/0873 180/291 |
| 3,903,738 A * | 9/1975 | Malchow | ................. | B60K 5/12 73/114.15 |

(Continued)

FOREIGN PATENT DOCUMENTS

EP 1008478 A2 * 6/2000 .......... B60K 5/1208
EP 1690722 A2 8/2006

(Continued)

*Primary Examiner* — Hiwot E Tefera
*Assistant Examiner* — Taylor L Morris
(74) *Attorney, Agent, or Firm* — Oliff PLC (57) ABSTRACT

An engine mounting structure includes an engine mount fixed to a frame of a vehicle body and an engine bracket fixed to an engine. The engine mount includes a mount fixture on which the engine bracket is assembled. When mounting the engine, the mount fixture and the engine bracket engage with each other at a first engagement portion close to the engine and a second engagement portion close to the frame. In the first mounting portion, the mount fixture urges the engine bracket toward the engine for engagement, and in the second engagement portion, the mount fixture urges the engine bracket toward the frame for engagement.

2 Claims, 9 Drawing Sheets

(56) References Cited

U.S. PATENT DOCUMENTS

| | | | | |
|---|---|---|---|---|
| 4,203,499 A * | 5/1980 | Miyata | B60K 5/1216 | 180/312 |
| 4,240,517 A * | 12/1980 | Harlow, Jr. | B60G 21/0551 | 180/295 |
| 4,377,218 A * | 3/1983 | Fukushima | B60K 5/1241 | 180/300 |
| 4,456,213 A * | 6/1984 | Fukushima | F16F 7/108 | 248/559 |
| 4,625,939 A * | 12/1986 | Bergelt | F16F 1/3615 | 248/638 |
| 4,958,603 A * | 9/1990 | Heimer | B60K 25/02 | 123/195 A |
| 5,031,873 A * | 7/1991 | Rau | F16F 1/52 | 248/632 |
| 5,035,296 A * | 7/1991 | Sjostrand | B60K 5/1216 | 180/292 |
| 5,035,397 A * | 7/1991 | Yamada | B60K 5/1208 | 180/297 |
| 5,090,502 A * | 2/1992 | Inoue | B60K 5/1291 | 180/292 |
| 5,372,216 A * | 12/1994 | Tsuji | B60G 99/00 | 180/274 |
| 5,462,465 A * | 10/1995 | Schmidt | B63H 21/30 | 248/659 |
| 5,523,530 A * | 6/1996 | Byrnes | B64C 27/001 | 181/208 |
| 5,788,207 A * | 8/1998 | Bunker | B60K 17/00 | 248/634 |
| 5,799,923 A * | 9/1998 | Carr | F16F 7/00 | 248/635 |
| 5,845,734 A * | 12/1998 | Samardzich | B60K 5/1216 | 180/299 |
| 5,954,309 A * | 9/1999 | Kato | B60K 5/1208 | 180/312 |
| 6,105,944 A * | 8/2000 | David | F16F 1/387 | 267/140.11 |
| 6,270,051 B1 * | 8/2001 | Power | B60K 5/12 | 248/634 |
| 6,270,066 B1 * | 8/2001 | Pasek | F16F 1/3814 | 180/299 |
| 6,298,936 B1 * | 10/2001 | Yoshida | B60K 5/1216 | 180/232 |
| 6,349,918 B1 * | 2/2002 | Bunker | B60K 5/1208 | 248/635 |
| 6,361,030 B1 * | 3/2002 | Rogge | F16F 1/371 | 267/136 |
| 6,371,462 B2 * | 4/2002 | Gennesseaux | F16F 13/108 | 267/122 |
| 6,390,224 B1 * | 5/2002 | Yoshida | B62D 21/00 | 180/311 |
| 6,408,974 B1 * | 6/2002 | Viduya | B62D 21/00 | 180/312 |
| 6,439,555 B2 * | 8/2002 | Takashima | B60K 5/1291 | 267/140.13 |
| 6,505,822 B1 * | 1/2003 | Yamamoto | F16F 13/106 | 267/140.13 |
| 6,511,059 B2 * | 1/2003 | Seynaeve | B60K 5/1208 | 248/635 |
| 6,517,061 B2 * | 2/2003 | Yamamoto | F16F 13/101 | 267/140.11 |
| 6,568,363 B2 * | 5/2003 | Koyama | F01L 1/02 | 123/195 A |
| 6,758,301 B2 * | 7/2004 | Shiba | B60K 5/1208 | 180/291 |
| 6,959,922 B2 * | 11/2005 | Miyahara | B60K 5/04 | 180/291 |
| 7,044,457 B2 * | 5/2006 | Bucksbee | F16F 1/3849 | 248/636 |
| 7,117,969 B2 * | 10/2006 | Miyamoto | B60K 5/1208 | 180/291 |
| 7,182,306 B2 * | 2/2007 | Tsutsumida | B60K 5/1291 | 248/609 |
| 7,207,553 B2 * | 4/2007 | Arakawa | B60K 5/1216 | 267/140.13 |
| 7,216,857 B2 * | 5/2007 | Yamamoto | F16F 13/101 | 267/140.13 |
| 7,341,243 B2 * | 3/2008 | Yamamoto | F16F 13/10 | 248/638 |
| 7,549,620 B2 * | 6/2009 | Kang | F16F 1/373 | 188/300 |
| 7,766,118 B2 * | 8/2010 | Ohji | B60K 5/12 | 180/291 |
| 8,002,252 B2 * | 8/2011 | Howorth | F16F 1/54 | 248/632 |
| 8,333,368 B2 * | 12/2012 | Rooke | F16F 13/268 | 188/282.6 |
| 8,397,856 B2 * | 3/2013 | Gruen | B60K 5/1208 | 180/291 |
| 8,794,646 B1 * | 8/2014 | Onishi | B62D 21/155 | 280/124.109 |
| 8,950,737 B2 * | 2/2015 | Prabhakar | F16F 3/0873 | 267/140.3 |
| 8,985,261 B2 * | 3/2015 | Driant | B60K 11/04 | 180/299 |
| 9,205,733 B2 * | 12/2015 | Olsen | B60K 5/1208 | |
| 9,409,472 B2 * | 8/2016 | Hatanaka | F16F 1/373 | |
| 9,593,732 B2 * | 3/2017 | Thierry | F16F 1/36 | |
| 9,618,078 B2 * | 4/2017 | Kondo | F16F 1/36 | |
| 9,738,147 B2 * | 8/2017 | Hlubina | B60K 5/12 | |
| 2004/0084600 A1 * | 5/2004 | Kanou | F16B 5/02 | 248/500 |
| 2004/0232307 A1 * | 11/2004 | Nemoto | F16F 13/26 | 248/638 |
| 2009/0095860 A1 * | 4/2009 | Yoon | B66C 1/10 | 248/225.11 |
| 2010/0059912 A1 * | 3/2010 | Takakura | B60K 5/1208 | 267/140.12 |
| 2014/0216832 A1 * | 8/2014 | Olsen | B60K 5/1208 | 180/54.1 |
| 2015/0129331 A1 * | 5/2015 | Konishi | B60K 5/12 | 180/54.1 |
| 2015/0129742 A1 * | 5/2015 | Okanaka | B60K 5/1208 | 248/634 |
| 2015/0360726 A1 | 12/2015 | Yuge | | |
| 2016/0001648 A1 * | 1/2016 | Kim | B60K 5/1283 | 248/566 |
| 2016/0116018 A1 * | 4/2016 | Yoshii | F16F 1/371 | 267/141 |
| 2018/0281579 A1 * | 10/2018 | Kim | B60K 5/1208 | |
| 2018/0320753 A1 * | 11/2018 | Beckmann | F16F 13/103 | |
| 2019/0016205 A1 * | 1/2019 | Yoon | B60K 5/1283 | |

FOREIGN PATENT DOCUMENTS

| | | |
|---|---|---|
| JP | 2006-219068 A | 8/2006 |
| JP | 2016-002871 A | 1/2016 |

\* cited by examiner

ENGINE MOUNTING STRUCTURE

CROSS REFERENCE TO RELATED APPLICATION

The disclosure of Japanese Patent Application No. 2017-220281 filed on Nov. 15, 2017 including the specification, claims, drawings, and abstract is incorporated herein by reference in its entirety.

TECHNICAL FIELD

The present disclosure relates to an engine mounting structure configured to mount an engine onto a vehicle body, and more particularly to an engine mounting structure including an engine mount and an engine bracket.

BACKGROUND

An automobile having an engine includes an engine mount for mounting the engine to a frame. The engine mount is fastened to an engine mounting bracket by means of fasteners such as a bolt and a nut. To mount the engine to the frame, a bolt is threaded through a fixing hole of the engine mount which is fastened to the engine mounting bracket (see JP 2006-219068 A, for example).

Another known structure includes an engine mount which is mounted to a frame such that the center axis of the engine mount is inclined toward the engine with respect to the vertical direction of the vehicle (see JP 2016-002871 A, for example).

SUMMARY

Technical Problem

Vehicles including an engine mount whose center axis is inclined with respect to the vehicle vertical direction, as described in JP 2016-002871 A, may suffer from the following disadvantage in mounting the engine and the engine mount to the frame. Specifically, the weight of the engine may collapse the rubber member of the engine mount to make the lower face of the mounting flange of the engine mount inclined with respect to the top face of the receiving flange of the frame, thus forming a space between the lower face of the mounting flange of the engine mount and the top surface of the receiving flange.

Figure 9:
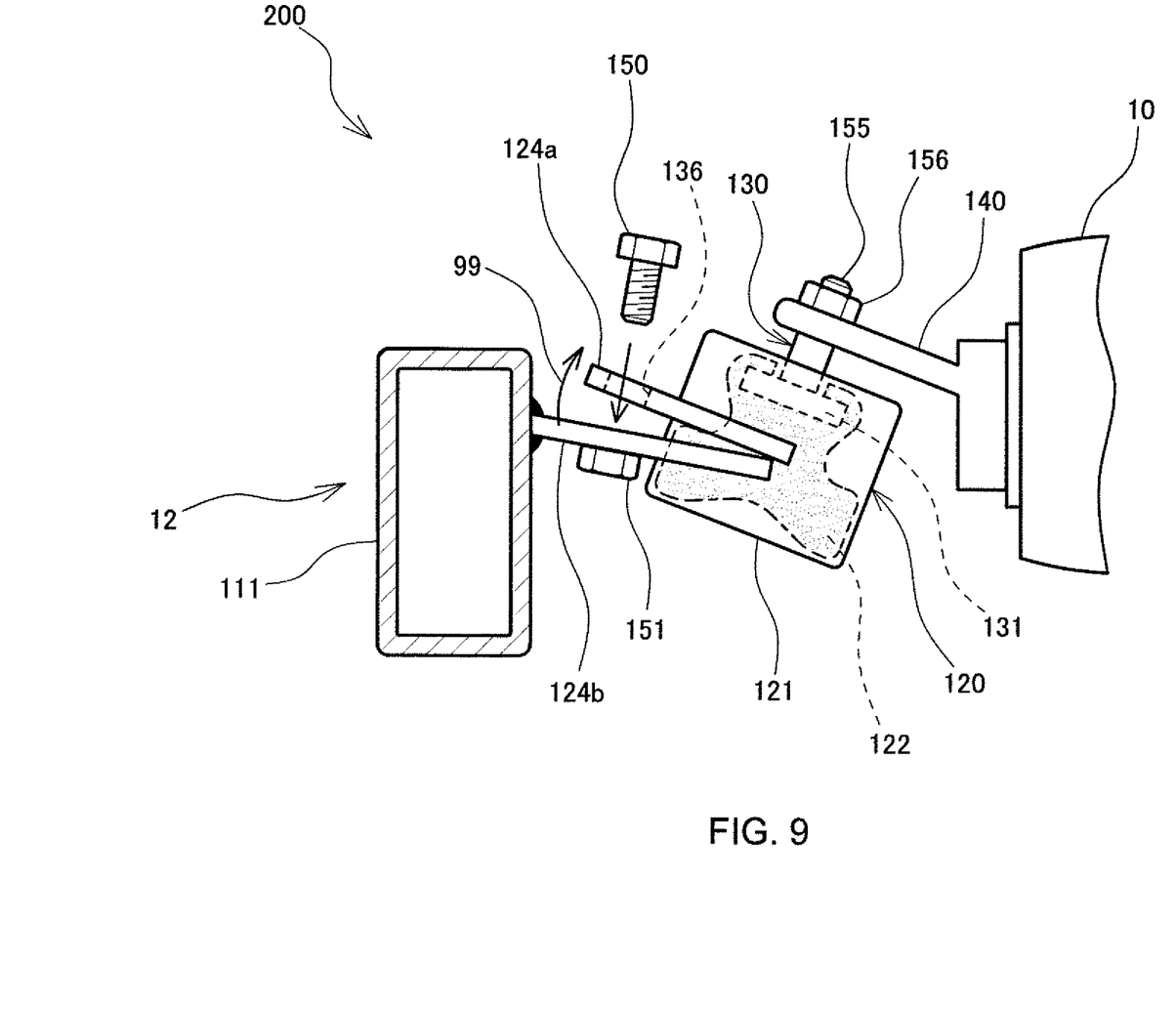
FIG. 9 is an explanatory view schematically illustrating the engine mount while mounting the engine in the engine mounting structure of related art.

An example engine mounting structure 200 of the related art illustrated in FIG. 9 will be briefly described. The engine mounting structure 200 includes an engine bracket 140 fixed to an engine 10, an engine mount 120 having an upper end fastened to the engine bracket 140 with a bolt 155 and a nut 156, and a receiving flange 124b welded to a frame 111.

As illustrated in FIG. 9, the engine mount 120 includes a rubber member 122 placed within a casing 121, a mount fixture 130 having its base 131 fixed to the rubber member 122, and a mounting flange 124a welded outside the casing 121. The engine mounting structure 200 further includes the receiving flange 124b welded to the frame 111 such that the receiving flange 124b extends obliquely downward from the frame of the vehicle body 12 toward the engine 10.

To mount the engine 10 onto the vehicle body 12, the bolt 155 embedded in the upper end of the mount fixture 130 of the engine mount 120 is threaded through a hole in the engine bracket 140 and is tightened and fastened with the nut 156, so that the engine 10, the engine bracket 140, and the engine mount 120 are integrally assembled. The engine 10 is then lowered to superpose the lower face of the mounting flange 124a of the engine mount 120 on the top face of the receiving flange 124b.

Here, the weight of the engine 10, when applied to the rubber member 122 of the engine mount 120, makes the rubber member 122 collapsed. This further causes the lower face of the mounting flange 124a of the engine mount 120 to be inclined with respect to the top face of the receiving flange 124b, as illustrated by arrow 99 in FIG. 9, thus forming a space between the lower face of the mounting flange 124a and the top face of the receiving flange 124b.

A bolt 150 is then screwed down into a nut 151 fixed to the receiving flange 124b through a bolt hole 136 formed in the mounting flange 124a. To bring the lower face of the mounting flange 124a into intimate contact with the top face of the receiving flange 124b, it is necessary to move the engine 10 slightly upward, which requires a significant clamping torque to fill the space. The engine mounting structure 200 of the related art illustrated in FIG. 9 thus suffers from problems including, for example, decreased reliability in assembling the engine and increased clamping torque of a fastening bolt for fastening the mounting flange of the engine mount and the frame.

An embodiment of the disclosure is directed toward increasing the assembling reliability in assembling an engine onto a vehicle body via an engine mount.

Solution to Problem

In accordance with one aspect of the disclosure, an engine mounting structure for mounting an engine to a vehicle body includes an engine mount fixed to a frame of the vehicle body such that a center axis of the engine mount is inclined toward the engine with respect to a vertical direction of a vehicle; and an engine bracket fixed to the engine and protruding from the engine toward the engine mount. The engine mount includes a mount fixture on which the engine bracket is assembled. The mount fixture and the engine bracket engage with each other at a first engagement portion close to the engine and a second engagement portion close to the frame when mounting the engine. In the first engagement portion, the mount fixture urges the engine bracket toward the engine for engagement with the engine bracket. In the second engagement portion, the mount fixture urges the engine bracket toward the frame for engagement with the engine bracket.

During mounting of the engine onto the engine mount fixed to the frame of the vehicle body, whose center axis is inclined toward the engine with respect to the vehicle vertical direction, the weight of the engine may collapse a rubber member of the engine mount. However, the first and second engagement portions restrict the movement of a portion of the mount fixture close to the engine toward the engine and the movement of a portion of the mount fixture close to the frame toward the frame. This structure thus regulates the relative motion between the mount fixture and the engine bracket to thereby reduce a space formed between the mount fixture and the engine bracket when mounting the engine, and increases the reliability in assembling the engine.

In the engine mounting structure, the first engagement portion may include a pin disposed on a part of the mount fixture close to the engine and protruding toward the vertical direction of the vehicle, and a hole formed on the engine bracket, through which the pin of the mount fixture passes. The second engagement portion may include a slope face formed on the mount fixture close to the frame and inclined diagonally downward toward the frame, and a clamp face extending from the hole of the engine bracket and being configured to be brought into contact with the slope face of the mount fixture.

This structure restricts a side face of the pin of the mount fixture facing the engine from coming into contact with a hole of the engine mount and moving an upper portion of the mount fixture toward the engine, and also restricts the slope face of the mount fixture from coming into contact with the clamp face of the engine mount and moving a lower portion of the mount fixture toward the frame when the weight of the engine makes the rubber member of the engine mount collapsed during mounting of the engine. This simple structure regulates a relative motion between the mount fixture and the engine bracket, to decrease a space formed between the mount fixture and the engine bracket, thereby enhancing the reliability of assembling the engine.

In the engine mounting structure, the mount fixture may include a protruding portion between the pin and the slope face, which extends in a straight line along a direction in which the frame extends. The engine bracket may include a level portion formed on a portion between the hole and the clamp face facing the mount fixture and being configured to be bought into contact with a ridgeline of the protruding portion. The engine bracket may be assembled on the mount fixture with the clamp face of the engine bracket being fastened on the slope face of the mount fixture by means of a bolt.

This structure, in which the ridgeline of the protruding portion of the mount fixture contacts the level portion of the engine bracket in line contact, reduces friction resistance caused by the relative motion between the mount fixture and the engine bracket when fastening the engine bracket to the mount fixture with a bolt. This structure thus prevents an increase in the clamping torque of the bolt and enhances the reliability in engine assembly.

Advantageous Effects of Invention

The disclosure increases the reliability in assembling an engine onto a vehicle body via an engine mount.

BRIEF DESCRIPTION OF DRAWINGS

An embodiment of the present disclosure will be described by reference to the following figures, wherein.

DESCRIPTION OF EMBODIMENTS

Figure 1:
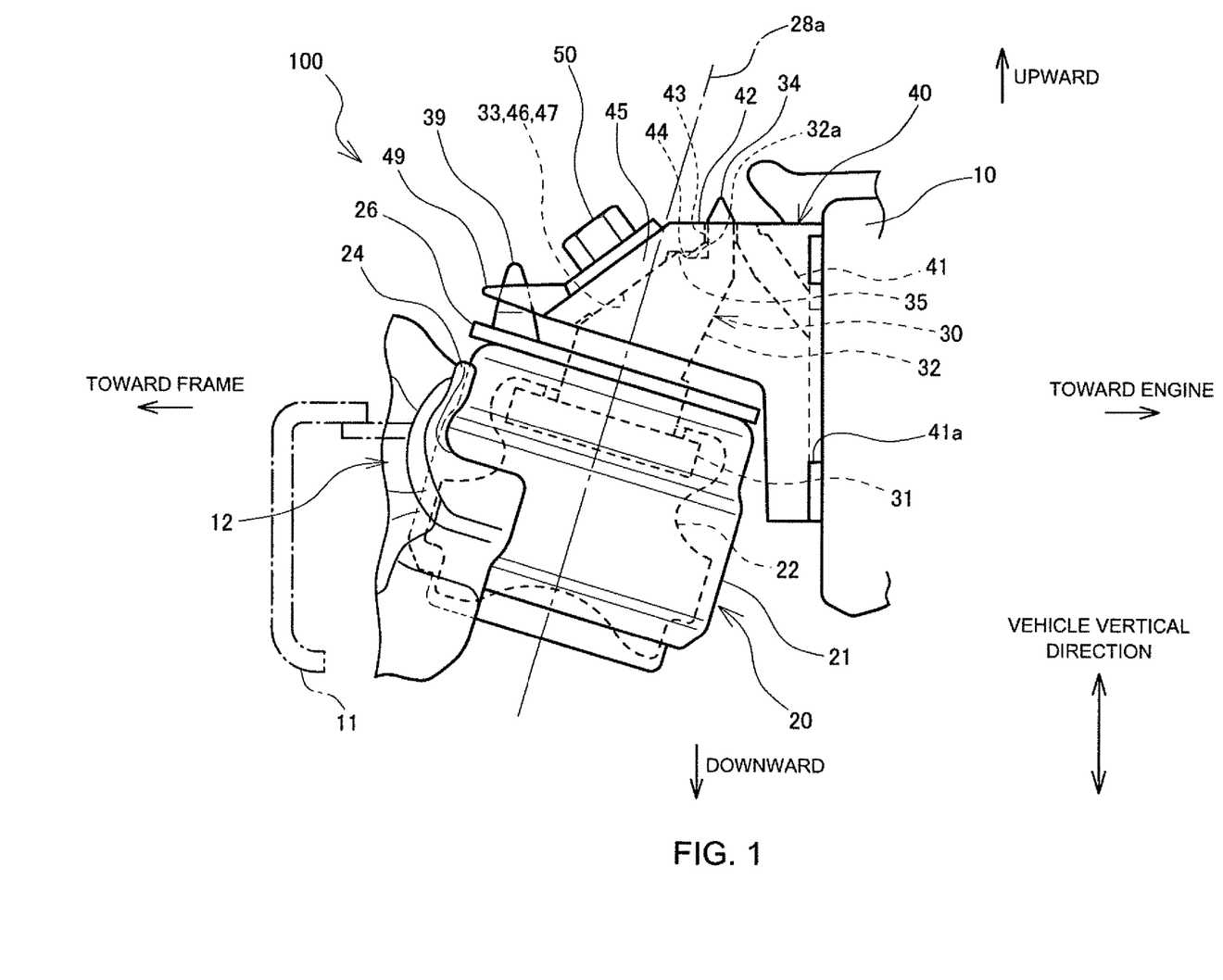
FIG. 1 is an elevation illustrating an engine mounting structure according to an embodiment.

An engine mounting structure 100 according to the present embodiment will be described by reference to the drawings. As illustrated in FIG. 1, the engine mounting structure 100 according to the present embodiment includes an engine mount 20 fixed to a vehicle body 12 and an engine bracket 40 fixed to an engine 10. The engine 10 is mounted onto the vehicle body 12 by engaging the engine bracket 40 with the engine mount 20 and fastening the engine bracket 40 to the engine mount 20 by means of a bolt 50.

As illustrated in FIG. 1, the engine mount 20, which is a cylindrical member, includes a metal casing 21, a rubber member 22 fixed within the casing 21, a mount fixture 30 fixed to an upper portion of the rubber member 22 by adhesion, and a lid 26.

Figure 2:
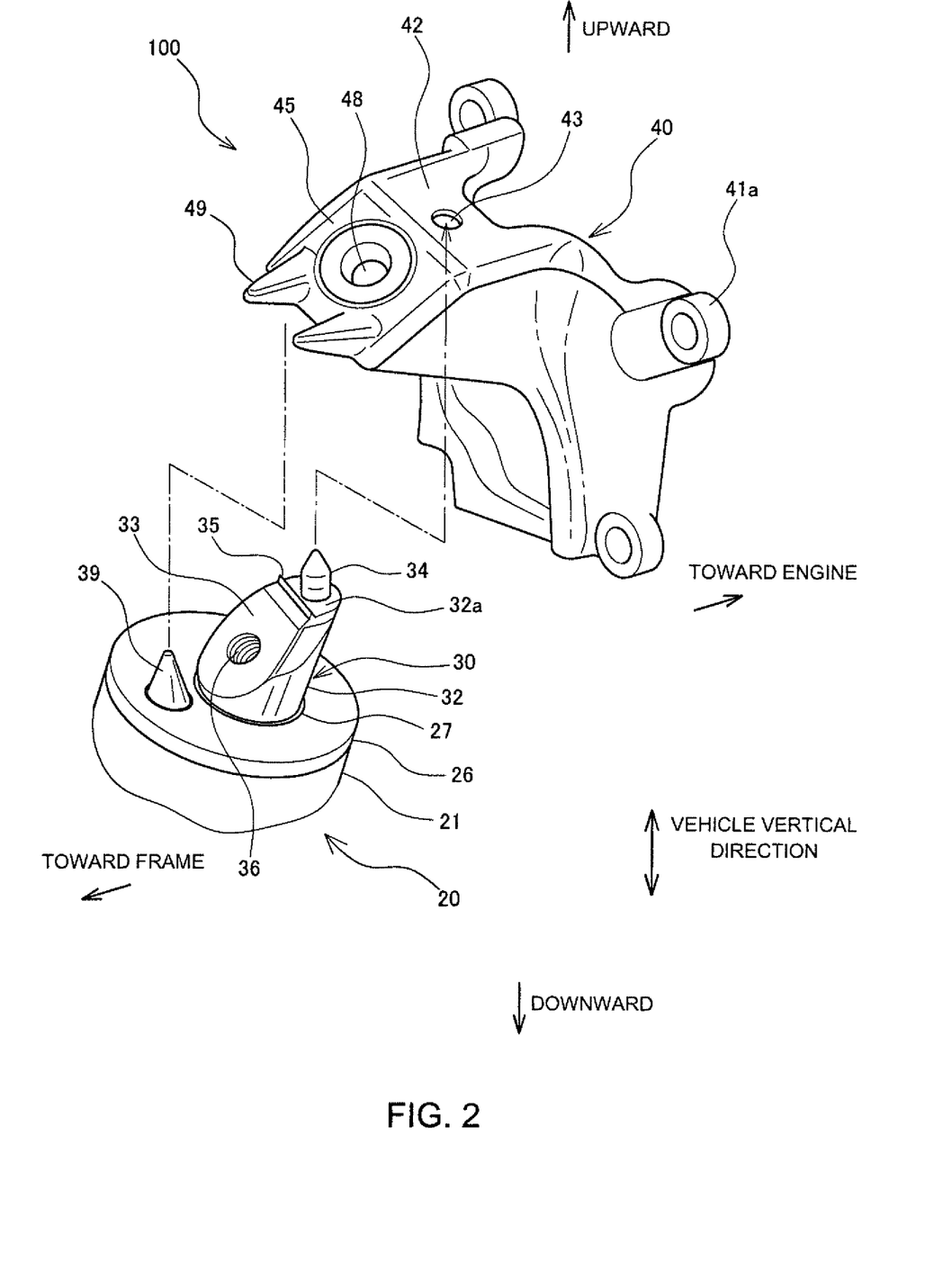
FIG. 2 is an exploded perspective view of an upper portion of an engine mount and an engine bracket in the engine mounting structure according to the present embodiment.
Figure 3:
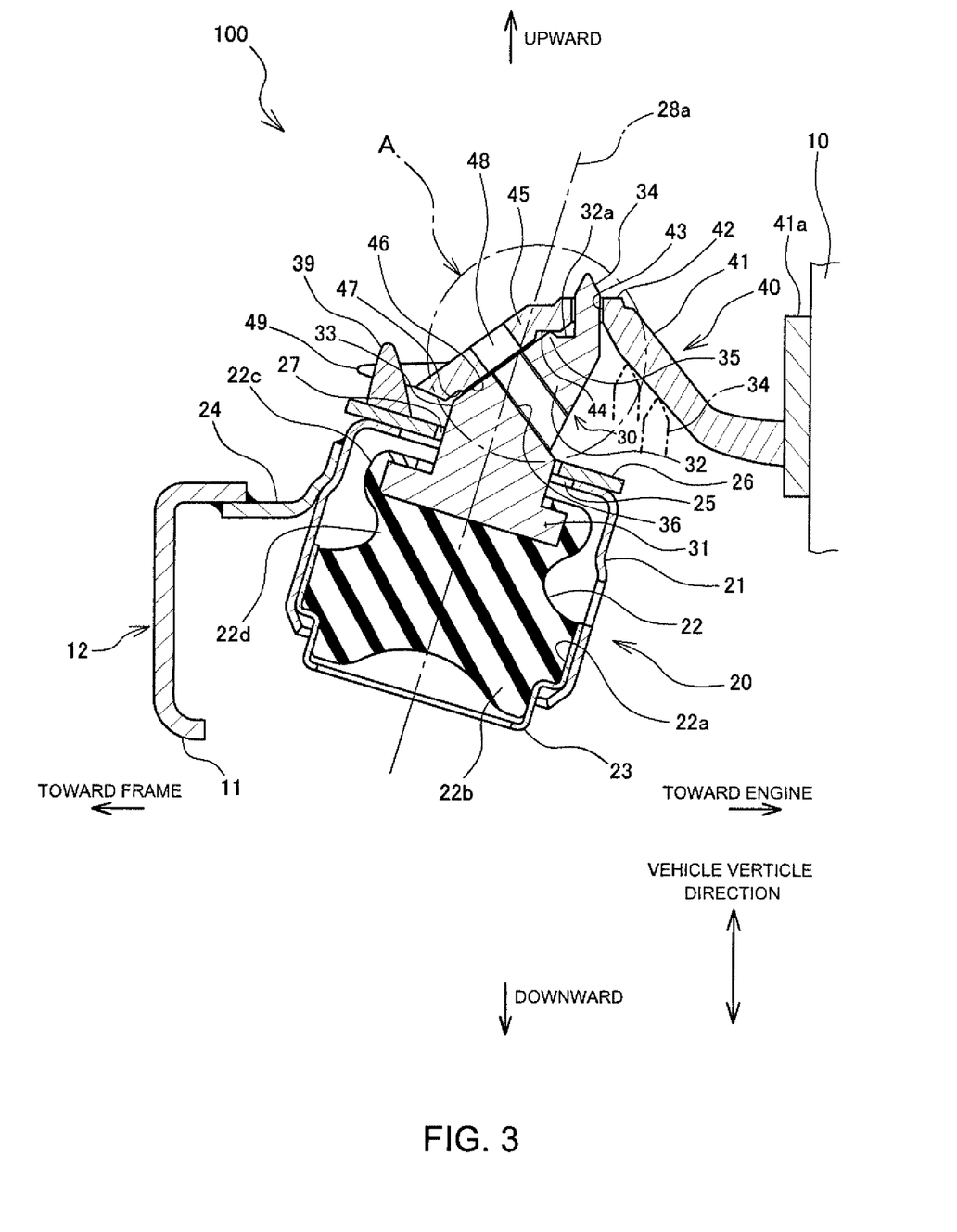
FIG. 3 is a cross sectional illustrating the engine bracket attached to the upper portion of the engine mount in the engine mounting structure according to the embodiment.

As illustrated in FIG. 3, the engine mounting structure 100 includes a bracket 24 welded to a portion of the casing 21 close to the frame 11 for fixing the casing 21 to the frame 11 of the vehicle body 12. The bracket 24 is also welded and fixed to the frame 11. The engine mount 20 is fixed to the frame 11 of the vehicle body 12 via the bracket 24 such that the center axis 28a of its cylindrical shape is inclined toward the engine 10 with respect to the vertical direction of the vehicle. As illustrated in FIG. 2, the lid 26 is attached to the upper end of the casing 21. The lid 26 has an opening 27 in the center and a protrusion 39 having a conical shape in a portion of the lid 26 close to the frame.

As illustrated in FIG. 3, the rubber member 22 includes a disk-like lower part 22b adhered to the inner face of an annular socket 22a by vulcanization, an upper lip part 22c for securing a base 31 of the mount fixture 30, and a narrow part 22d between the lip part 22c and the lower part 22b. The outer circumferential face of the lower part 22b is fixed to the inner face of the socket 22a by vulcanization adhesion, and the outer circumferential face of the socket 22a is fitted and fixed to a lower inner face of the casing 21.

As illustrated in FIGS. 2 and 3, the mount fixture 30 includes the disk-like base 31 adhered to the lip part 22c of the rubber member 22 within the casing 21 by vulcanization, and an engagement block 32 extending outward of the casing 21 from the base 31 through the opening 27 of the lid 26 along the center axis 28a. The engagement block 32 has a shape corresponding to a part of a substantially column shape extending along the center axis 28a, with a diagonally cut face on a side of the column facing the frame. The engagement block 32 includes a slope face 33, an upper end face 32a, a pin 34, and a protruding portion 35. The slope face 33 is inclined diagonally downward toward the frame 11 and includes a bolt hole 36 in the center. The upper end face 32a is a level surface. The pin 34 having a column shape with a tapered tip end is disposed to protrude upward in the vertical direction of the vehicle from the upper end face 32a. The protruding portion 35 is disposed on the upper end face 32a between the pin 34 and the slope face 33, and has a ridge shape extending in a straight line along the extending direction of the frame 11.

Figure 5:
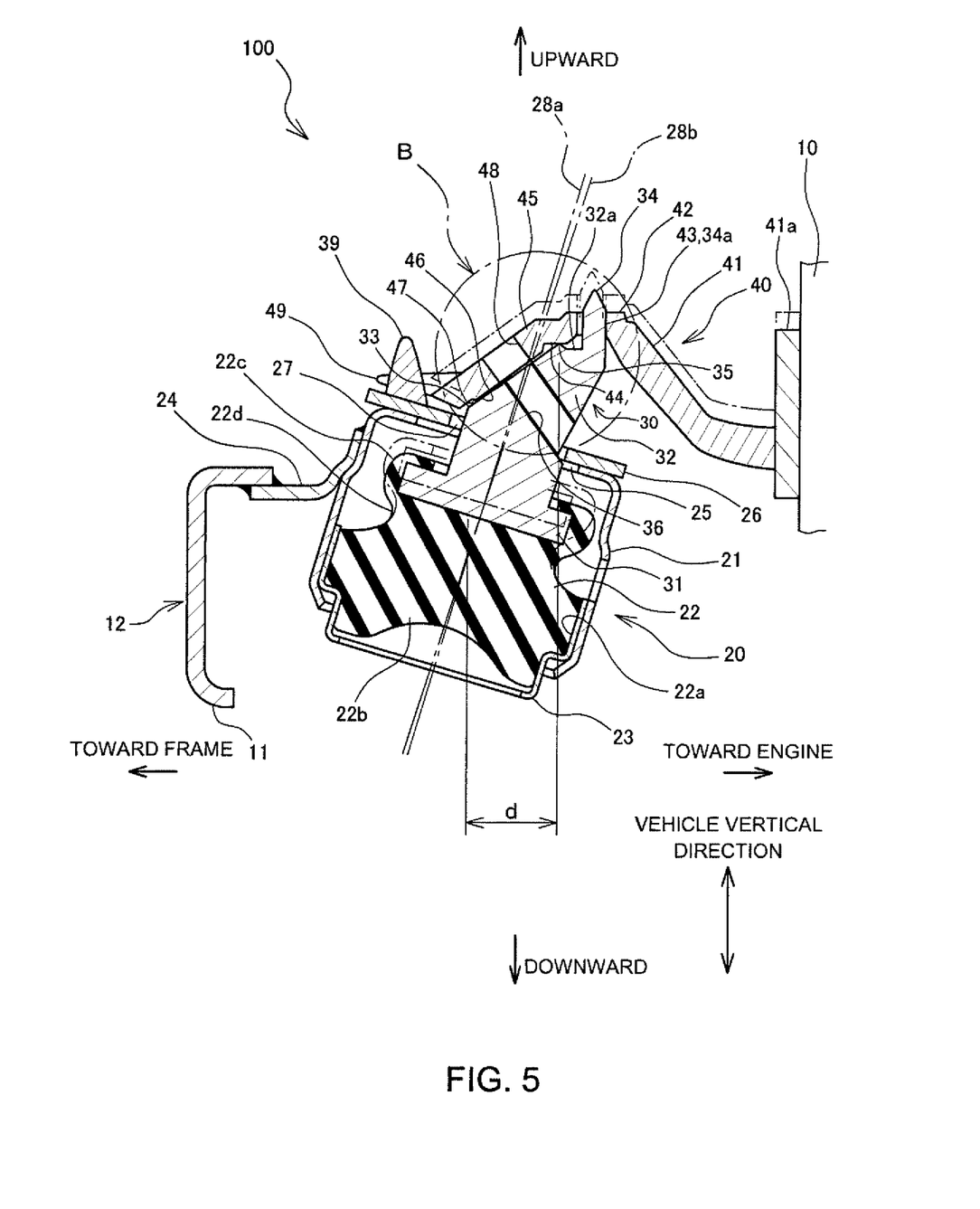
FIG. 5 is a cross sectional view illustrating the rubber member of the engine mount collapsed under the weight of the engine in the engine mounting structure according to the embodiment.
Figure 7:
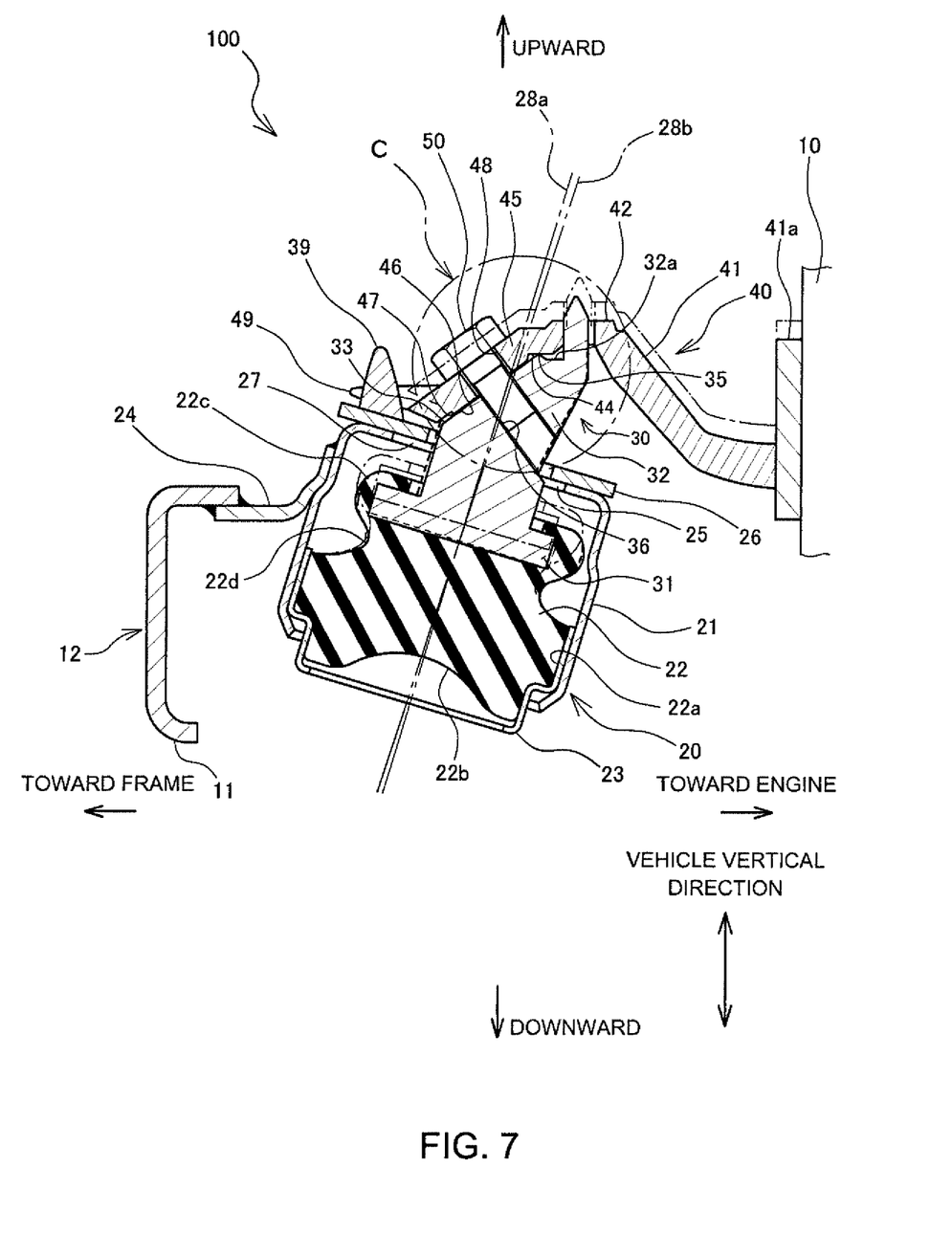
FIG. 7 is a cross sectional view illustrating the engine bracket and the mount fixture of the engine mount that are fastened with a bolt in the engine mounting structure according to the embodiment.

The engine bracket 40 has a substantially L shape, as illustrated in FIG. 2. As illustrated in FIGS. 1 and 3, the engine bracket 40 includes a base 41a fixed to the engine 10 by means of a bolt, an arm portion 41 extending from the base 41a to protrude diagonally upward toward the engine mount 20, a top portion 42 connected to the arm portion 41 and extending horizontally, a clamp portion 45 extending diagonally downward from the top portion 42 toward the frame, and two guide claws 49 protruding from the leading end of the clamp portion 45 toward the frame. The top portion 42 has, in its center, a hole 43 through which the pin 34 of the mount fixture 30 passes. The engine bracket 40 includes a level portion 44 in a portion between the hole 43 in the top portion 42 and the clamp portion 45 close to the mount fixture 30. The clamp portion 45 includes, in its center, a hole 48 through which the bolt 50 passes. As illustrated in FIG. 3, the clamp portion 45 includes, in its lower face facing the slope face 33 of the mount fixture 30, a mount 47 protruding toward the slope face 33. The surface of the mount 47 constitutes a clamp face 46 coming into contact with the slope face 33. As described, the clamp surface 46 is a plane extending diagonally downward from the level portion 44 located at a lower part of the top portion 42 having the hole 43 and coming into contact with the slope face 33 of the mount fixture 30. The arm portion 41 is schematically represented in FIGS. 3, 5, and 7 for explanation.

As illustrated in FIG. 2, with the hole 43 of the engine bracket 40 fixed to the engine 10 being aligned with the pin 34 of the mount fixture 30, and the protrusion 39 of the mount fixture 30 being placed between the two guide claws 49 of the engine bracket 40, the engine bracket 40 is placed on the engagement block 32 of the mount fixture 30. Then, as illustrated in FIG. 1, with the clamp face 46 of the engine bracket 40 being put on the slope face 33 of the mount fixture 30, the bolt 50 is threaded through the hole 48 of the clamp portion 45 of the engine bracket 40 and is further screwed into the bolt hole 36 of the slope face 33, thereby assembling the engine bracket 40 onto the engine mount 20.

Referring to FIGS. 3 to 8, process steps for assembling the engine bracket 40 onto the engine mount 20 will be described in detail below.

Figure 4:
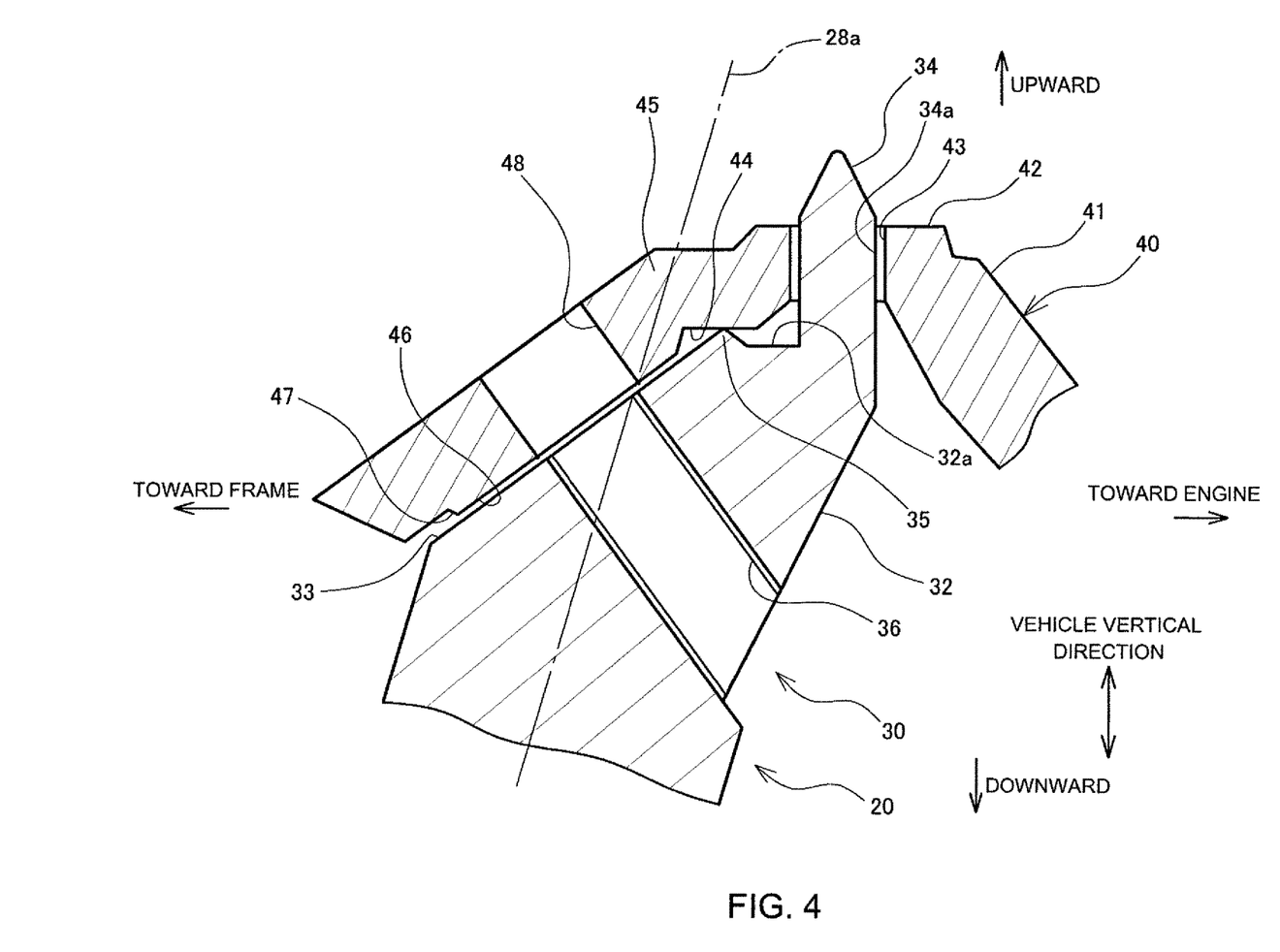
FIG. 4 is an enlarged cross sectional view of portion A in FIG. 3.

First, as indicated by dashed and single-dotted lines in FIG. 3, the engine 10 and the engine bracket 40 are moved downward toward the engine mount 20 while the tip end of the pin 34 is being moved along the lower face of the arm portion 41 of the engine bracket 40. Then, with the hole 43 of the engine bracket 40 being aligned with the pin 34 of the mount fixture 30 and with the two guide claws 49 of the engine bracket 40 pinching the protrusion 39 of the mount fixture 30, the engine 10 and the engine bracket 40 are lowered, so that the level portion 44 formed on the lower face of the top portion 42 of the engine bracket 40 comes into contact with the ridgeline of the tip end of the protruding portion 35 formed on the upper end face 32a of the mount fixture 30, as illustrated in FIG. 4. In this state, the weight of the engine 10 is not yet imposed on the engine mount 20 and there is a space between the clamp face 46 of the engine bracket 40 and the slope face 33 of the mount fixture 30.

Figure 6:
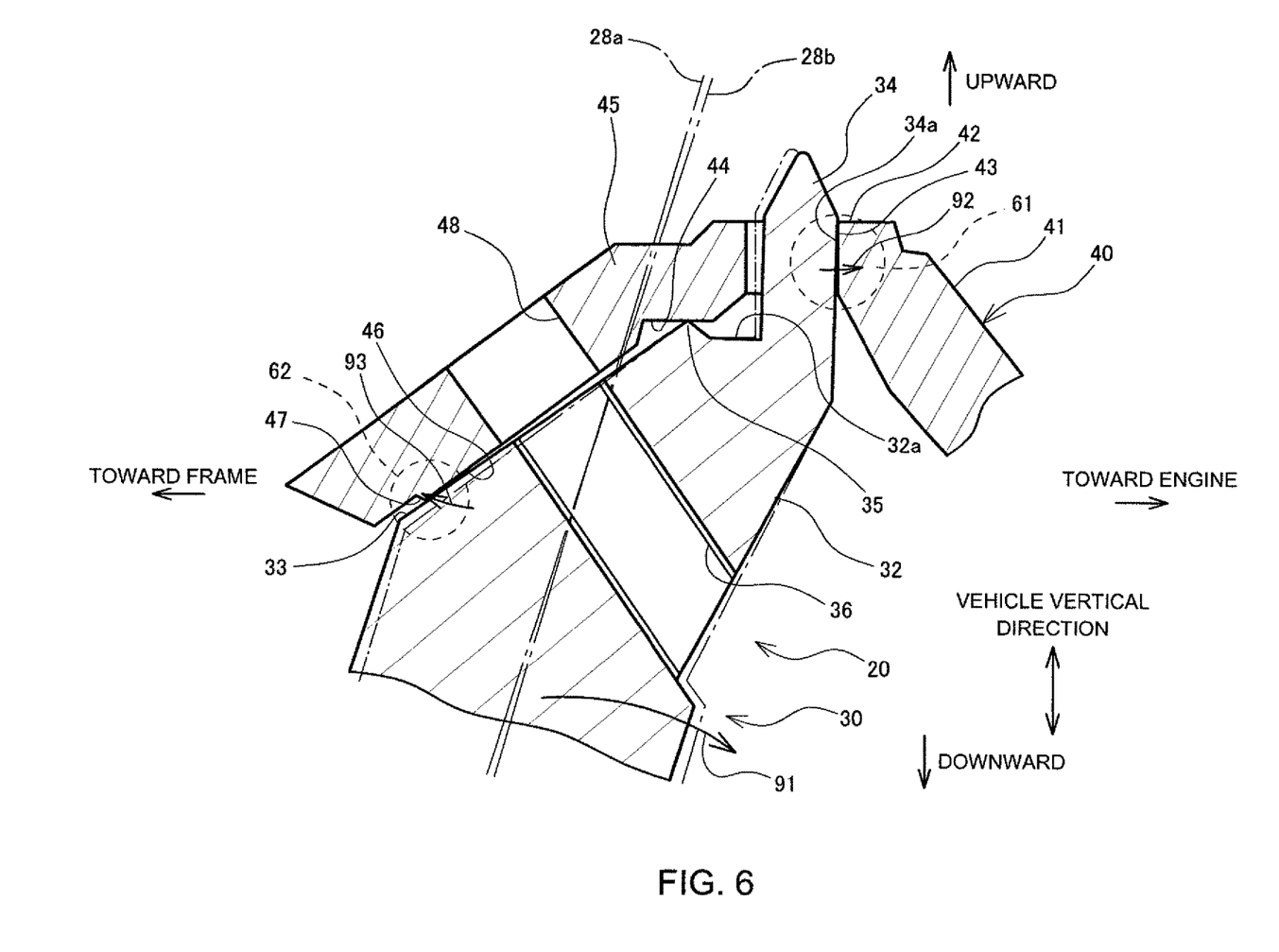
FIG. 6 is an enlarged cross sectional view of portion B in FIG. 5.

Further downward movement of the engine 10 causes the weight of the engine 10 to be transmitted from the level portion 44 of the engine bracket 40 to the protruding portion 35 of the mount fixture 30 and imposed on the engine mount 20, as illustrated in FIG. 6. The weight of the engine 10 thus compresses and collapses the rubber member 22 of the engine mount 20, as illustrated in FIG. 5. Consequently, the engine bracket 40 and the mount fixture 30 in a state where no weight of the engine 10 is imposed thereon as indicated by dashed and single-dotted line in FIG. 5 move downward to a state indicated by solid line in FIG. 5. The engine mount 20 is fixed to the frame 11 such that its center axis 28a is inclined toward the engine 10 with respect to the vehicle vertical direction. As the protruding portion 35, which is a point where the weight of engine 10 is transmitted to the engine mount 20, is displaced from the center of the rubber member 22 toward the engine by a distance "d," the weight of the engine 10 makes the rubber member 22 compressed and collapsed downward, and also causes the rubber member 22 to rotate counterclockwise and deform as illustrated in FIG. 5. This further causes the engagement block 32 of the mount fixture 30, in a state where no weight of the engine 10 is imposed as indicated by dashed and single-dotted line in FIG. 6, to rotate, with respect to the engine bracket 40, about the ridgeline of the tip end of the protruding portion 35 to the position indicated by a solid line as indicated by arrow 91 in FIG. 6. At this time, the center axis 28a of the engine mount 20 illustrated in FIGS. 3 and 4 is inclined toward the engine 10 as the center axis 28b illustrated in FIGS. 5 and 6.

These movements further bring a side face 34a of the pin 34 of the mount fixture 30 facing the engine into contact with a face of the hole 43 formed on the top portion 42 of the engine bracket 40, which is closer to the frame. Also, the slope face 33 of the mount fixture 30 comes into contact with the lower end of the clamp face 46 of the engine bracket 40. The pin 34 of the mount fixture 30 urges the engine bracket 40 toward the engine 10 for engagement, in the direction of arrow 92 in FIG. 6. The slope face 33 of the mount fixture 30 urges the clamp face 46 of the engine bracket 40 toward the frame 11 for engagement, as indicated by arrow 93 in FIG. 6. The pin 34 of the mount fixture 30 and the hole 43 of the engine bracket 40 together restrict the movement of a portion of the mount fixture 30 close to the engine toward the engine 10. The slope face 33 of the mount fixture 30 and the clamp face 46 of the engine bracket 40 together restrict the movement of a portion of the mount fixture 30 close to the frame toward the frame 11. The pin 34 of the mount fixture 30 and the hole 43 of the engine bracket 40 form a first engagement portion 61 near the engine, and the slope face 33 of the mount fixture 30 and the clamp face 46 of the engine bracket 40 form a second engagement portion 62 near the frame.

As such, the first engagement portion 61 and the second engagement portion 62 restrict the rotating movement of the mount fixture 30, which is a relative motion of the mount fixture 30 with respect to the engine bracket 40, caused by rotating deformation of the rubber member 22 of the engine mount 20, which is collapsed under the weight of the engine 10, while the engine 10 is being mounted. When the weight of the engine 10 makes the rubber member 22 further collapsed, the space between the slope face 33 of the mount fixture 30 and the clamp face 46 of the engine bracket 40 remains unchanged. This is because the first engagement portion 61 and the second engagement portion 62 restrict the rotating movement of the mount fixture 30 with respect to the engine bracket 40.

As described above, the engine mounting structure 100 according to the present embodiment can maintain a small space formed between the slope face 33 of the mount fixture 30 and the clamp face 46 of the engine bracket 40 during mounting of the engine 10.

Figure 8:
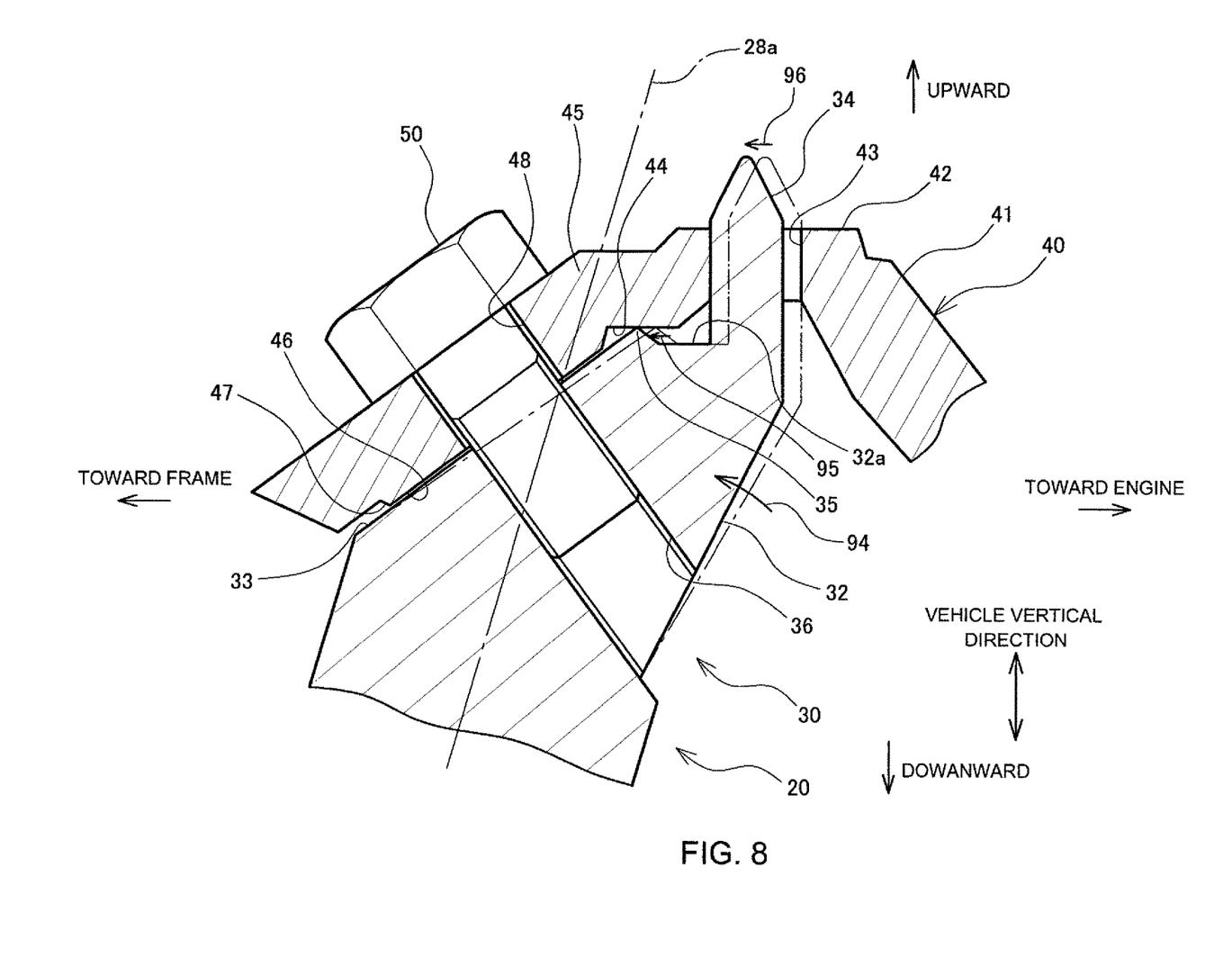
FIG. 8 is an enlarged cross sectional view of portion C in FIG. 7.

After imposing all the weight of the engine 10 on the engine mount 20, the bolt 50 is threaded through the hole 48 of the clamp portion 45 of the engine bracket 40 and is screwed into the bolt hole 36 in the slope face 33, as illustrated in FIGS. 7 and 8. Screwing the bolt 50 generates a force that attracts the slope face 33 of the mount fixture 30 toward the clamp face 46 of the engine bracket 40 and this force makes the rubber member 22 collapsed. As the bolt 50 is screwed downward, the slope face 33 moves toward the clamp face 46 as indicated by arrow 94 in FIG. 8, and the space between the slope face 33 and the clamp face 46 is gradually reduced. At this time, the ridgeline on the tip end of the protruding portion 35 of the mount fixture 30, on which the weight of the engine 10 is partially imposed from the level portion 44 of the engine bracket 40, also moves toward the frame with respect to the level portion 44, as indicated by arrow 95 in FIG. 8. During this movement, resistance acts in the direction opposite the moving direction due to friction between the level portion 44 and the ridgeline on the tip end of the protruding portion 35. While this resistance can increase the clamping force of the bolt 50, the engine mounting structure 100 according to the present embodiment prevents an increase in the clamping force of the bolt 50. This is because the protruding portion 35 having a sharp-pointed ridgeline contacts the level portion 44 of the engine bracket 40 in line contact, which decreases the frictional resistance between the tip end of the protruding portion 35 and the level portion 44 during their relative motion. This structure regulates an increase in the clamping torque of the bolt 50 to thereby enhance the reliability in assembling the engine 10.

The bolt 50 is then tightened to bring the slope face 33 and the clamp face 46 into intimate contact with each other and introduce a predetermined torque to the bolt 50. Thus, assembling the engine bracket 40 on the engine mount 20 is completed.

As described above, the engine mounting structure 100 according to the present embodiment includes the first engagement portion 61 including the pin 34 of the mount fixture 30 and the hole 43 of the engine bracket 40 and the second engagement portion 62 including the slope face 33 of the mount fixture 30 and the clamp face 46 of the engine bracket 40. The first engagement portion 61 and the second engagement portion 62 restrict the relative motion of the mount fixture 30 with respect to the engine bracket 40 caused by rotating deformation of the rubber member 22 of the engine mount 20 which is collapsed under the weight of the engine 10 during mounting of the engine 10. This structure reduces the space generated between the slope face 33 of the mount fixture 30 and the clamp face 46 of the engine bracket 40 during mounting of the engine 10, thereby increasing the reliability in assembling the engine 10.

Further, the engine mounting structure 100 according to the present embodiment, which achieves line contact between the ridgeline on the tip end of the protruding portion 35 of the mount fixture 30 and the level portion 44, reduces friction resistance caused during the relative motion between the tip end of the protruding portion 35 and the level portion 44 to suppress the clamping force of the bolt 50. This further regulates the increase in the clamping torque of the bolt 50, thereby enhancing the reliability in assembling the engine 10.

While in the present embodiment, the first engagement portion 61 includes the pin 34 of the mount fixture 30 and the hole 43 of the engine bracket 40, the invention is not limited to this structure. For example, the first engagement portion 61 may be configured such that a protrusion formed on the upper end face 32a of the mount fixture 30 in addition to the pin 34 engages with a recess formed on the level portion 44 of the engine bracket 40 facing the upper end face 32a to urge the engine bracket 40 toward the engine 10.

While in the present embodiment, the mount fixture 30 includes the protruding portion 35 on the upper end face 32a, the mount fixture 30 may be configured such that the upper end face 32a and the slope face 33 are contiguous without the protruding portion 35. In this configuration, the weight of the engine 10 is transmitted from the level portion 44 of the engine bracket 40 to the upper end face 32a of the mount fixture 30, and the mount fixture 30 and the level portion 44 of the engine bracket 40 form plane contact.

The invention claimed is:

1. An engine mounting structure for mounting an engine to a vehicle body, comprising:
    an engine mount fixed to a frame of the vehicle body such that a center axis of the engine mount is inclined toward the engine with respect to a vertical direction of a vehicle; and
    an engine bracket fixed to the engine, the engine bracket protruding from the engine toward the engine mount, wherein
        the engine mount includes a mount fixture on which the engine bracket is assembled,
        when mounting the engine, the mount fixture and the engine bracket engage with each other at a first engagement portion close to the engine and a second engagement portion close to the frame, wherein in the first engagement portion, the mount fixture urges the engine bracket toward the engine for engagement with the engine bracket and in the second engagement portion the mount fixture urges the engine bracket toward the frame for engagement with the engine bracket;
        the first engagement portion comprises a pin disposed on a part of the mount fixture close to the engine, the pin protruding upward in the vertical direction of the vehicle, and a hole formed on the engine bracket, through which the pin of the mount fixture passes,
        the second engagement portion comprises a slope face formed on the mount fixture close to the frame, the slope face being inclined diagonally downward toward the frame, and a clamp face extending from the hole of the engine bracket toward the frame, the clamp face being configured to be brought into contact with the slope face of the mount fixture,
        the mount fixture comprises a protruding portion disposed between the pin and the slope face, the protruding portion extending in a straight line along a direction in which the frame extends,
        the engine bracket comprises a level portion disposed between the hole and the clamp face, the level portion facing the mount fixture,
        a tip end of the protruding portion forms a sharp-pointed ridgeline, the ridge line being configured to be brought into contact with the level portion when mounting the engine, and
        the engine bracket is assembled on the mount fixture with the clamp face of the engine bracket being fastened on the slope face of the mount fixture by means of a bolt.

2. The engine mounting structure according to claim 1, wherein
    the engine bracket protrudes toward the engine mount and has a substantially L-shape, the engine bracket comprising:
        a base fixed to the engine,
        an arm portion extending from the base to protrude diagonally upward toward the engine mount,
        a top portion connected to the arm portion and extending horizontally, a clamp portion extending diagonally downward from the top portion toward the frame, and two guide claws protruding from a leading end of the clamp portion toward the frame, the engine mount comprising:

a casing in which the mount fixture is enclosed, a center axis of the casing being inclined toward the engine with respect to the vertical direction of the vehicle, and a lid attached to an upper end portion of the casing and having a protrusion on an upper surface in a portion of the lid close to the frame, and the protrusion is pinched between the two guide claws when mounting the engine.

\* \* \* \* \*